United States Patent
Erler et al.

(10) Patent No.: US 12,466,282 B2
(45) Date of Patent: Nov. 11, 2025

(54) PRIMARY CIRCUIT DEVICE, SECONDARY CIRCUIT DEVICE, AND SYSTEM FOR INDUCTIVE CHARGING

(71) Applicant: BRUSA Elektronik AG, Sennwald (CH)

(72) Inventors: Martin Erler, Dornbirn (AT); Marc Hanselmann, Frümsen (CH)

(73) Assignee: BRUSA ELEKTRONIK AG, Sennwald (CH)

( * ) Notice: Subject to any disclaimer, the term of this patent is extended or adjusted under 35 U.S.C. 154(b) by 1139 days.

(21) Appl. No.: 17/252,570

(22) PCT Filed: Jun. 24, 2019

(86) PCT No.: PCT/EP2019/066675
§ 371 (c)(1),
(2) Date: Dec. 15, 2020

(87) PCT Pub. No.: WO2020/002240
PCT Pub. Date: Jan. 2, 2020

(65) Prior Publication Data
US 2021/0252992 A1 Aug. 19, 2021

(30) Foreign Application Priority Data
Jun. 29, 2018 (DE) ...................... 10 2018 115 816.5

(51) Int. Cl.
*H02J 7/00* (2006.01)
*B60L 53/12* (2019.01)
(Continued)

(52) U.S. Cl.
CPC ............... *B60L 53/62* (2019.02); *B60L 53/12* (2019.02); *H02J 7/00308* (2020.01);
(Continued)

(58) Field of Classification Search
CPC .......... B60L 53/62; B60L 53/12; B60L 53/00; B60L 53/10; B60L 53/126; B60L 53/30; B60L 53/36; B60L 53/39; B60L 53/60
(Continued)

(56) References Cited

U.S. PATENT DOCUMENTS 9,666,357 B2 * 5/2017 Keeling ................. H02J 50/70
2008/0174267 A1 7/2008 Onishi et al.
(Continued)

FOREIGN PATENT DOCUMENTS

CN  103728533 A  4/2014
CN  105471017 A  4/2016
(Continued)

OTHER PUBLICATIONS

English-language translation of International Preliminary Report on Patentability issued in International Application No. PCT/EP2019/066675 on Jan. 7, 2021.

*Primary Examiner* — Alexis B Pacheco
(74) *Attorney, Agent, or Firm* — Hoffmann & Baron, LLP (57) ABSTRACT

A secondary circuit device including a secondary coil for transmitting and/or receiving magnetic energy of a magnetic field and converting the magnetic energy into electrical energy; a rectifier for rectifying the electrical energy; and a detection unit; wherein the secondary coil is connected to the rectifier via a conducting unit, the conducting unit for transmitting electrical active energy and an electrical reactive energy; the conducting unit connected to an input of the rectifier; the rectifier having an output for providing the electrical active energy as voltage and/or current; the detection unit connected to the input and/or the output of the rectifier to detect an overvoltage at the input and/or the output of the rectifier and/or an external magnetic field; and, when the overvoltage is detected, the detection unit is designed such that it influences the conducting unit and/or (Continued)

the magnetic field to limit the transmission of the electrical active energy.

10 Claims, 4 Drawing Sheets

(51) Int. Cl.
  *B60L 53/62* (2019.01)
  *H02J 7/14* (2006.01)
  *H02J 50/12* (2016.01)

(52) U.S. Cl.
  CPC ........... *H02J 50/12* (2016.02); *B60L 2210/30* (2013.01); *H02J 2207/20* (2020.01); *H02J 2310/48* (2020.01)

(58) Field of Classification Search
  USPC ......................................................... 320/137
  See application file for complete search history.

(56) References Cited

U.S. PATENT DOCUMENTS

| | | | | |
|---|---|---|---|---|
| 2011/0227421 | A1* | 9/2011 | Sakoda | B60L 53/12 307/104 |
| 2012/0025761 | A1* | 2/2012 | Takada | B60L 53/122 320/108 |
| 2012/0200266 | A1* | 8/2012 | Berkowitz | H01M 10/44 320/139 |
| 2013/0009650 | A1* | 1/2013 | Sakakibara | B60L 58/12 324/633 |
| 2013/0024059 | A1* | 1/2013 | Miller | H02J 7/00034 320/108 |
| 2013/0257370 | A1* | 10/2013 | Ichikawa | H02J 50/80 320/108 |
| 2013/0334892 | A1* | 12/2013 | Hall | B60L 53/124 307/104 |
| 2014/0292263 | A1 | 10/2014 | Asselin | |
| 2015/0102687 | A1 | 4/2015 | Miyamoto et al. | |
| 2015/0130294 | A1 | 5/2015 | Suzuki et al. | |
| 2016/0089988 | A1 | 3/2016 | Bartz et al. | |
| 2016/0297309 | A1* | 10/2016 | Kim | H02M 7/44 |
| 2018/0342897 | A1* | 11/2018 | Huang | B60L 53/55 |
| 2018/0358837 | A1* | 12/2018 | Sakakibara | H02J 7/00714 |
| 2019/0255966 | A1* | 8/2019 | Lee | B60L 53/32 |

FOREIGN PATENT DOCUMENTS

| | | |
|---|---|---|
| CN | 106887904 A | 6/2017 |
| CN | 106910953 A | 6/2017 |
| CN | 106921200 A | 7/2017 |
| DE | 102010054472 A1 | 6/2012 |
| DE | 102015223230 A1 | 5/2017 |
| EP | 2043226 A2 | 4/2009 |
| EP | 2868516 A1 | 5/2015 |
| EP | 3103674 A1 | 12/2016 |
| JP | 2012044762 A | 3/2012 |
| WO | WO 2012/176571 A1 | 12/2012 |

* cited by examiner

PRIMARY CIRCUIT DEVICE, SECONDARY CIRCUIT DEVICE, AND SYSTEM FOR INDUCTIVE CHARGING

CROSS-REFERENCE TO RELATED APPLICATIONS

The present application is the U.S. National Phase of PCT/EP2019/066675, filed on Jun. 24, 2019, which claims priority to German Patent Application No. 10 2018 115 816.5, filed on Jun. 29, 2018, the entire contents of which are incorporated herein by reference.

BACKGROUND

Field

The invention relates to the technical field of inductive charging. In particular, the present invention relates to a secondary circuit device, a primary circuit device, a system for inductive charging, a method for supplying energy with the secondary circuit device, a method for transmitting energy with a primary circuit device and a method for testing the secondary circuit device.

Related Art

A system for inductive energy transmission can be used to electrically charge a purely electric vehicle (EV, electric vehicle) or a hybrid vehicle (PHEV, plug-in hybrid-electric vehicle) that is operated with a combination of fuel and electrical energy, if the charging is to be done contactlessly. In such a system, an alternating magnetic field is generated in the frequency range of 25 kHz-150 kHz. It must be noted that outside this frequency band, the limit values for the emission of electromagnetic waves are specified by internationally applicable standards. This is because, even though a magnetic field is used in principle for energy transmission, it is an electromagnetic wave due to the fact that the magnetic field changes inherently. However, because of the slow changes in the field strengths, the electromagnetic wave used in inductive charging has a wavelength of several kilometers.

In order to comply with these limit values for emissions, it must be ensured that the alternating magnetic field used for energy transmission works with a fundamental oscillation in the range of 25 kHz-150 KHz and contains only very low harmonics. Therefore, filters are used that remove disruptive harmonics as much as possible. In addition, in order to comply with the internationally applicable standards and guidelines, it must be ensured that energy transmission only takes place when a certain quality of the coupling to one another is achieved by setting a certain alignment of the coupling elements to one another, for example, by a positioning system such as is described in the document EP 3 103 674 A1.

The document EP 2 868 516 A1 describes a method for regulating the energy transmitted between two resonators of a system for contactless energy transmission.

A GPM (ground pad module) with a primary coil is used as a coupling element for the energy transmission on the stationary side and a CPM (car pad module) with a secondary coil on the vehicle side. GPM and CPM form a transformer for the coupling and energy transmission. The physical alignment of the coupling elements to one another is measured and set via a positioning signal, for example, WLAN (wireless local area network). Different transmission paths and different transmission technologies are used for the transmission of energy and the transmission of the positioning signal.

However, the energy transmission could be disrupted by the loss of a load on the secondary side.

SUMMARY

It may be seen as an object of the present invention to allow an effective transmission of energy.

Accordingly, a secondary circuit device, a primary circuit device, a system for inductive charging, a method for supplying energy with the secondary circuit device, a method for transmitting energy with a primary circuit device are specified and a method for testing the secondary circuit device is specified.

The subject matter of the invention is indicated by the features of the independent patent claims. Embodiments and further aspects of the invention are specified by the dependent claims and the following description.

According to one aspect of the invention, a secondary circuit device or a secondary circuit arrangement is specified which has a secondary coil for transmitting and/or receiving magnetic energy of a magnetic field and for converting the magnetic energy into electrical energy, a rectifier unit for rectifying the electrical energy and a secondary-side detection unit. The secondary coil is connected to the rectifier unit via an energy conducting unit, and the energy conducting unit is designed to transmit electrical active energy and electrical reactive energy. In particular, the energy conducting unit is arranged between the secondary coil and the rectifier unit. In one example, the secondary coil can be assigned at least partially to the energy conducting unit. The energy conducting unit is connected to an input of the rectifier unit and the rectifier unit has an output for providing the electrical active energy as voltage and/or current. Furthermore, the secondary-side detection unit is connected to the input and/or the output of the rectifier unit in order to detect an overvoltage of the voltage at the input and/or the output of the rectifier unit and/or to detect an external magnetic field, and, when the overvoltage is detected at the input and/or the output of the rectifier unit, the secondary-side detection unit is designed such that it influences the energy conducting unit and/or the magnetic field in order to limit the transmission of the electrical active energy.

The transmission can essentially be limited by two measures. On the one hand, the source can be switched off, for example, on the primary side. On the other hand, a transmission path, for example, the energy conducting unit, can also be influenced in such a way that the amount of energy transported is reduced, for example, by means of attenuation. Various other measures are possible and can be combined with one another in any number.

According to a further aspect of the present invention, a primary circuit device is described which has an energy generating device for providing electrical energy as electrical active energy and/or electrical reactive energy and a primary coil for converting the electrical energy into a magnetic energy. The energy generating device is connected to the primary coil and the primary coil is designed to transmit and/or receive the magnetic energy. The energy generating device is also designed to extract a command, a signal and/or reactive energy from a received magnetic energy and to derive a control command from the received command, signal and/or from the received reactive energy in order to change a variable of the energy provided or to essentially completely prevent the supply of energy. The signal can be, for example, a magnetic field fluctuation, a magnetic field increase, a current fluctuation and/or a voltage fluctuation. The command can be a command transmitted over a radio link, for example, by means of a WLAN system. The signal and/or command could also be transmitted by means of a positioning signal which also uses a magnetic field fluctuation, but lies within a different frequency range than the magnetic field which is used for the energy transmission. The positioning signal may be a physical signal which is emitted in a direction opposite to that used for energy transmission. In one example, a positioning signal may be sent out when a CPM is aligned with respect to a GPM and there is still no energy transmission taking place. The command, signal and/or energy may be generated and sent out by the secondary circuit device. However, it may also be possible to send out the command, signal and/or energy in the opposite direction, to no longer receive it or to reflect it, in particular, if the functionality of the secondary circuit device is to be tested.

According to another aspect of the present invention, a system for inductive charging is specified, which has a car pad module device with the secondary circuit device and a ground pad module device with the primary circuit device, wherein the car pad module device and the ground pad module device can be coupled via a magnetic field. In the coupled state, the car pad module device and the ground pad module device form a loosely coupled system, i.e., a system that can be disconnected at any time, for example, when the car pad module device moves counter to the ground pad module device or vice versa.

According to another aspect of the present invention, a method for supplying energy with a secondary circuit device is described, which includes transmitting and/or receiving magnetic energy of a magnetic field and converting the magnetic energy into electrical energy with a secondary coil. The method also includes the transmission of electrical active energy and electrical reactive energy with an energy conducting unit to an input of a rectifier unit and the rectification of the electrical energy with the rectifier unit, and the provision of the electrical active energy as voltage and/or current at an output of the rectifier unit. The method also provides for an overvoltage to be detected at the input and/or at the output of the rectifier unit and/or an external magnetic field with a detection device and to influence the energy conducting unit and/or the magnetic field with the secondary-side detection unit when the overvoltage is detected at the input and/or at the output of the rectifier unit in order to limit the transmission of the electrical active energy.

The overvoltage may occur when the voltage at the output of the rectifier unit and/or at the input of the rectifier unit exceeds a predeterminable limit value.

According to yet another aspect of the present invention, a method for energy transmission with a primary circuit device is described, wherein the method has the provision of electrical energy as electrical active energy and/or electrical reactive energy with an energy generating device and the conversion of the electrical energy into a magnetic energy with a primary coil. Furthermore, the method provides for the transmitting and/or receiving of the magnetic energy with the primary coil, the extraction of a command, a signal and/or reactive energy with the energy generating device and the derivation of a control command from the received command and/or the received reactive energy with the energy generating device in order to change a variable of the energy provided.

In one example, the car pad module, in particular, the clamper circuit unit, is designed in such a way that it detects an externally originating magnetic field, i.e., a magnetic field originating from a source other than the ground pad module that is assigned to the car pad module, and by this detection activates the clamper circuit unit and/or the protective circuit. For example, a magnetic field can be weakened by a defective ground pad module or a maliciously injected strong magnetic field and destruction of the car pad module can be prevented by amplification of the harmful magnetic field.

The device for influencing the primary circuit device, the energy conducting unit and/or the magnetic field in order to limit the transmission of the electrical active energy can be designed as a clamper circuit unit, clamping circuit, limit switch, protective circuit or crowbar. For example, the crowbar can be designed as a switch. A crowbar can be used to protect an intermediate circuit link, a DC link, in particular, an HVDC link, from overvoltage if the driving energy source has a high input impedance, such as a current source or the oscillating circuit of the car pad module.

According to a further aspect of the present invention, a method for testing the secondary circuit device is described in which the secondary circuit device is first coupled to a primary circuit device. A test signal is then injected into the energy conducting unit for transmission to the primary circuit device in order to obtain a comparison value. The test signal is detected in the primary circuit device, whereupon the energy conducting unit and/or the magnetic field are influenced in the secondary circuit device with the secondary-side detection unit and/or with a clamping circuit. After this influencing, a change in the test signal is detected again in the primary circuit device. If a predefinable change is detected, the correct functioning of the secondary circuit device is assumed. By simulating a fault situation in the secondary circuit device, it can thus be checked whether the protective circuit or clamping circuit is functioning correctly.

In other words, a functional test of the communication channel between secondary circuit device and primary circuit device can be carried out by influencing the energy conducting unit and/or the magnetic field between the primary circuit device and the secondary circuit device by means of the clamper circuit unit, and using a test signal to check whether this influencing is successful. For example, a positioning signal, which is either injected into the energy conducting unit and/or into the rectifier unit for propagation in the direction of the primary circuit device, can be used as the test signal. If the test signal, which is propagated from the secondary circuit device in the direction of the primary circuit device, is attenuated by activation of the clamper or protective switching device in such a way that the test signal received at the primary circuit device is below a predeterminable limit value and/or essentially cannot be detected at all, it is thus assumed that the clamper circuit unit and the influencing of the energy conducting unit and/or of the magnetic field caused thereby are functioning correctly. In an alternative example, a reverse direction of propagation for the test signal is possible, that is, generation of the test signal in the primary circuit device and propagation in the direction of the secondary-side detection unit, where the test signal and/or the change in the test signal can be detected or not detected depending on functionality.

The crowbar or clamping circuit can also be used for various other functional tests due to its switching function.

In an example of a function test with the clamper circuit unit, the clamper circuit unit can be arranged at the output of the rectifier unit and controlled by the primary circuit device via one of the communication channels present between the primary device and the secondary device. Thus, a load on the secondary circuit device side can be short-circuited by means of the clamper circuit unit, and a ratio of the active energy to that of the apparent energy can be measured on the primary circuit device side, and a phase shift between current and voltage on the primary side can be determined to calibrate an active power measurement on the primary side.

In yet another example, a change in the current and/or voltage ratios and/or the power on the secondary side can be brought about by means of the clamper circuit unit, which, due to the magnetic coupling between the primary circuit device and the secondary circuit device, also makes a change in the current and/or voltage ratios and/or the power noticeable. This change in the current and/or voltage ratios and/or the power propagates in the direction counter to the direction of propagation of the energy and can be detected in the primary circuit device. The change in the current and/or voltage ratios and/or the power can be interpreted as information that propagates counter to the direction of propagation of the energy. This information can be evaluated on the primary side by the primary circuit device and be used to switch off the energy supply. The response time of this information transmission on a physical level can be higher or faster than a transmission system that works with a plurality of communication layers, for example, with OSI layers (open systems interconnection) or a WLAN (wireless LAN) system. By evaluating the physical information, the primary circuit device can therefore react more quickly to a fault on the secondary side than it could react if a complex communication system were used. As a result, the use of the physical information can be used to quickly switch off the energy supply on the primary side. The function of this physical return channel can be tested by specifically activating the clamping circuit and by evaluating the states resulting from this activation. As a result, the components contained in the return channel can also be tested, such as comparators or control devices. Because of the reciprocity of the signal propagation, conclusions can ultimately be drawn about the functionality of the channel in both directions.

According to yet another aspect of the present invention, a computer-readable storage medium is provided on which a program code is stored which, when it is executed by a processor, executes at least one of the described methods. A control device or controller can use such a processor.

A floppy disk, a hard disk, a USB (universal serial bus) storage device, a RAM (random access memory), a ROM (read only memory) or an EPROM (erasable programmable read only memory) may be used as a computer-readable storage medium. An ASIC (application-specific integrated circuit) or an FPGA (field-programmable gate array) as well as an SSD (solid-state drive) technology or a flash-based storage medium may also be used as storage media. A web server or a cloud can also be used as a storage medium. A communication network, such as the Internet, for example, which may allow program code to be downloaded, can also be viewed as a computer-readable storage medium. A radio-based network technology and/or a wired network technology can be used.

According to yet another aspect of the present invention, a program element is created which, when executed by a processor, executes at least one of the methods.

According to a further aspect of the present invention, the secondary-side detection unit is designed to change a quality and/or impedance and/or a resonant frequency of the energy conducting unit when the overvoltage is detected at the output.

According to one aspect of the present invention, the change in the resonant frequency of the energy conducting unit can be carried out by connecting and/or disconnecting a capacitor and/or a capacitance and/or a capacitance part in the energy conducting unit.

Changing the resonant frequency may lead to detuning of the energy conducting unit and thus detuning of the transmission path, so that the output is protected from excessive energy and/or power supply, even if energy is still being supplied by a primary circuit device. For example, in the event of a load shedding at the output, an overvoltage can be reduced or even essentially completely avoided.

According to one aspect of the present invention, the change in the impedance and/or quality of the energy conducting unit can be achieved by short-circuiting the rectifier unit.

The rectifier unit may be short-circuited at the input of the rectifier unit and lead to a resonant transmission circuit formed by the secondary coil with a capacitor and/or another coil, so that only a fraction of the energy arriving at the secondary coil is transmitted via the energy conducting unit. By changing the impedance and/or quality and/or resonant frequency, the energy arriving via the secondary coil is reflected, for example, back to a primary circuit device. This reflection can then be detected in the primary circuit device and the primary circuit device can interrupt the energy transmission to the secondary circuit device in order to prevent an overvoltage from occurring at the output of the secondary circuit device.

According to another aspect of the present invention, the secondary-side detection unit is designed to provide a command and/or signal upon detection of the overvoltage at the input and/or output of the rectifier unit in such a way that it can be transmitted via the magnetic field in order to control an energy transmission device to change the magnetic energy of the magnetic field.

Such a command and/or signal can be generated, for example, in the form of the reflected energy when there is a change in the quality on the physical level, as a result of which the energy generation can be switched off quickly. Such a command and/or signal can, however, also be distributed via another communication channel, for example, via a positioning signal channel and/or a WLAN communication channel. Because the magnetic field is essentially only present during the energy transmission, the overvoltage can essentially only be communicated to the primary circuit device via the magnetic field during the energy transmission. Using another separate channel, communication can also be carried out earlier or later before/after the energy transmission.

According to another aspect of the present invention, the secondary-side detection unit is designed, when the overvoltage is detected at the input and/or output of the rectifier unit, to adapt the energy conducting unit so that the electrical reactive energy is at least partially reflected and transmitted via the magnetic field.

The reflected reactive energy can be evaluated by a primary circuit device in order to stop the generation of the energy.

According to another aspect of the present invention, the secondary-side detection unit is designed to interrupt the energy conducting unit and/or the secondary coil when the overvoltage is detected at the input and/or output of the rectifier unit.

In particular, the secondary-side detection unit may be designed to control a clamping circuit in such a way that it interrupts the energy conducting unit and/or the secondary coil. Interrupting the secondary coil may be understood to mean, in addition to opening a physical connection between the secondary coil and the energy conducting unit, also the disconnection of an oscillating circuit formed with the secondary coil and a capacitor.

BRIEF DESCRIPTION OF THE DRAWINGS

In the following, further example embodiments of the present invention are described with reference to the figures.

DETAILED DESCRIPTION

The representations in the figures are schematic and not to scale. In the following description of FIGS. 1 to 7, the same reference numbers are used for the same or corresponding elements.

In this text, the terms "capacitor" and "capacitance" as well as "coil" or "choke" and "inductance" may be used synonymously and should not be interpreted restrictively unless otherwise specified.

Figure 1:
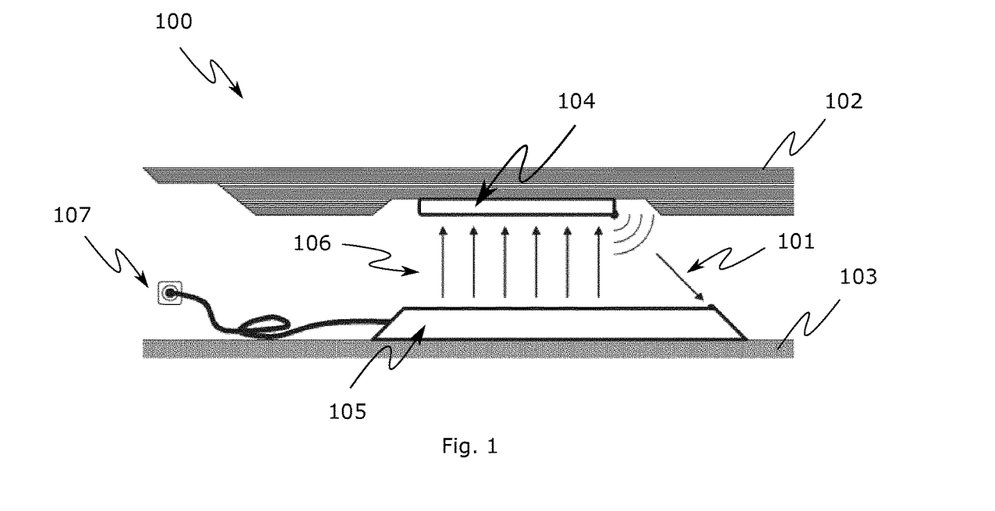
FIG. 1 shows an inductive charging system according to an example embodiment of the present invention.

FIG. 1 shows an inductive charging system 100 or system 100 for energy transmission according to an example embodiment of the present invention. This shows a side view of a system for contactless charging of an electric vehicle. A car pad module (CPM) 104, which is used to supply the vehicle 102 with electricity, is located below a vehicle chassis 102. For the transmission of the energy, a magnetic field is used which inductively provides the energy from a ground pad module (GPM) 105 fixedly mounted on a floor 103. The energy required for charging is taken from the main terminal 107 and can be both alternating current (AC) and direct current (DC). A separate connection 101 is used for communication between CPM 104 and GPM 105, which connection can use, for example, a radio protocol such as WLAN (wireless LAN) or NFC. This connection can be used as a feedback channel 101 or as a communication channel 101 via which the CPM 104 and GPM 105 can exchange information. Both the magnetic field for energy transmission 106 and the radio signal 101 are electromagnetic waves which, however, have different frequencies.

Figure 2:
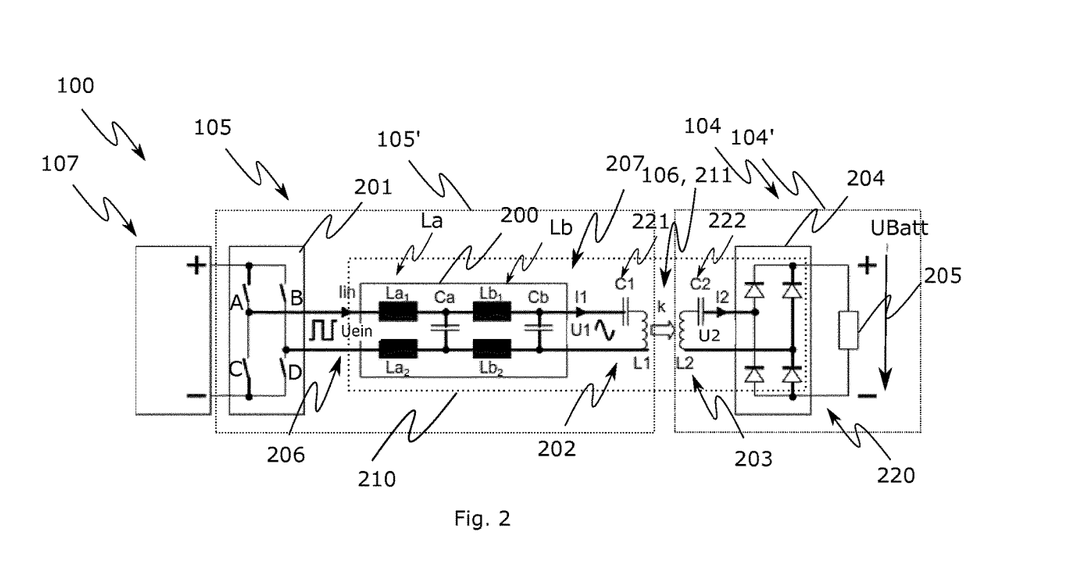
FIG. 2 shows a block diagram of an inductive charging system according to an example embodiment of the present invention.

FIG. 2 shows a block diagram of an inductive charging system 100 according to an example embodiment of the present invention. A system for inductive energy transmission is considered, which can be used for contactless charging of an electric vehicle. In such a system, an alternating magnetic field 106 is generated in the frequency range of, for example, 25 kHz-150 kHz. It must be noted that outside this frequency band, the limit values for the emission of electromagnetic waves are specified by internationally applicable standards. In order to comply with these limit values, it is crucial that the alternating magnetic field 106 works with the fundamental oscillation in the range of 25 kHz-150 KHz and contains only very low harmonics.

On the other hand, the efficiency of the power transmission should be as high as possible and therefore a rectangular signal with the fundamental frequency of the alternating magnetic field 106 is generated with electronic switches within an inverter 201, for example, by means of MOSFETs, IGBTs, because this results in very low losses. However, the rectangular signal contains considerable harmonics. These harmonics can be filtered out very well with a filter 200, for example, an LC filter. However, the filter 200 can be designed differently. A filter 4 is shown by way of example in FIG. 2. Shown in order, but other arrangements of capacitors and coils are also possible. The input current $I_{in}$ and the input voltage $Ue_{in}$ are present at the input 206 of the filter 200. The filter 200 has two input coils $La_1$ and $La_2$ connected in parallel and the filter input capacitor Ca as well as the output coils $Lb_1$ and $Lb_2$ connected in parallel and the filter output capacitor Cb. Instead of the two input coils $La_1$ and $La_2$ connected in parallel, a single input coil La can also be used. Instead of the two input coils $Lb_1$ and $Lb_2$ connected in parallel, a single input coil Lb can also be used.

The input coils $La_1$ and $La_2$ are directly connected to the output of the inverter 201. This may directly mean that no further component is interposed. A capacitor connected in parallel should not turn a direct connection into an indirect connection. The output coils $Lb_1$ and $Lb_2$ at the output 220 of the filter 200 are connected directly to the coils $La_1$ and $La_2$, as well as to the primary resonant circuit 202. The primary resonant circuit 202 is supplied with the voltage U1 and the current I1 or IL, which has originated from the alternating current generated by the inverter 201. Due to the filter effect of the filter 200, the primary current I1 and the primary voltage U1 have a sinusoidal profile.

The primary resonant circuit 202 has the primary resonant coil L1 or primary coil L1 and the primary resonant capacitor C1 221. The primary resonant circuit 202 converts the current I1 and the voltage U1 into the alternating magnetic field 106. The alternating magnetic field 106 couples with a couple factor k into the secondary resonant circuit 203 and transfers the energy from the primary circuit to the secondary circuit 203 by means of a resonant and inductive energy transmission.

The secondary resonant circuit 203 has the secondary resonant coil L2 or secondary coil L2 and the secondary resonant capacitor C2 222. Because the secondary resonant circuit 203 is set to the resonant frequency of the primary resonant circuit 202, the secondary resonant circuit 203 converts the magnetic field 106 into a secondary current I2 and into a secondary voltage U2. These are fed to the rectifier unit 204 or the rectifier 204, which can provide a DC voltage at its output 220 to a load 205, for example, a battery 205, an intermediate circuit 205, a traction circuit 205 or an HV-DC 205 on the side of the CPM 104.

The inductive charging system 100 is supplied via a direct voltage source 107 or HV-DC (high-voltage direct current) or via an alternating voltage 107.

The energy transmission system 100, for example, an ICS system 100, has a base station 105 or GPM 105, a remote device 104 or a CPM 104, wherein the base station 105 and the remote device 104 can be loosely coupled to one another via an inductive coupling and the feedback channel 101. If the CPM 104 is positioned accordingly in relation to the GPM 105, a loose coupling can be assumed.

The base station 105 or GPM 105 has the primary circuit 202 and the remote device 104, or CPM 104 has the secondary circuit 203. The primary circuit 202 has the coil L1 and the secondary circuit 203 has the coil L2. If the coils L1 and L2 are brought closer to one another, magnetic fields 106 which are generated by the coils can penetrate the other coil L1, L2. The part of the magnetic field that penetrates the other coil L1, L2 forms the inductive coupling with the couple factor k or the coupling factor k. This coupling forms a loosely coupled transformer 211. The part of the magnetic field 106 which lies outside the respective other coil L1, L2 forms a stray capacitance. The smaller the part of the stray capacitance that is formed, the greater the couple factor k. However, because a transformer with a core in which the couple factor k is essentially constant cannot be formed due to the mobility of the GPM 105 and CPM 104 with respect to one another, the couple factor in the loosely coupled transformer is variable and depends, for example, on the relative position of the GPM 105 and CPM 104 to each other.

Figure 3:
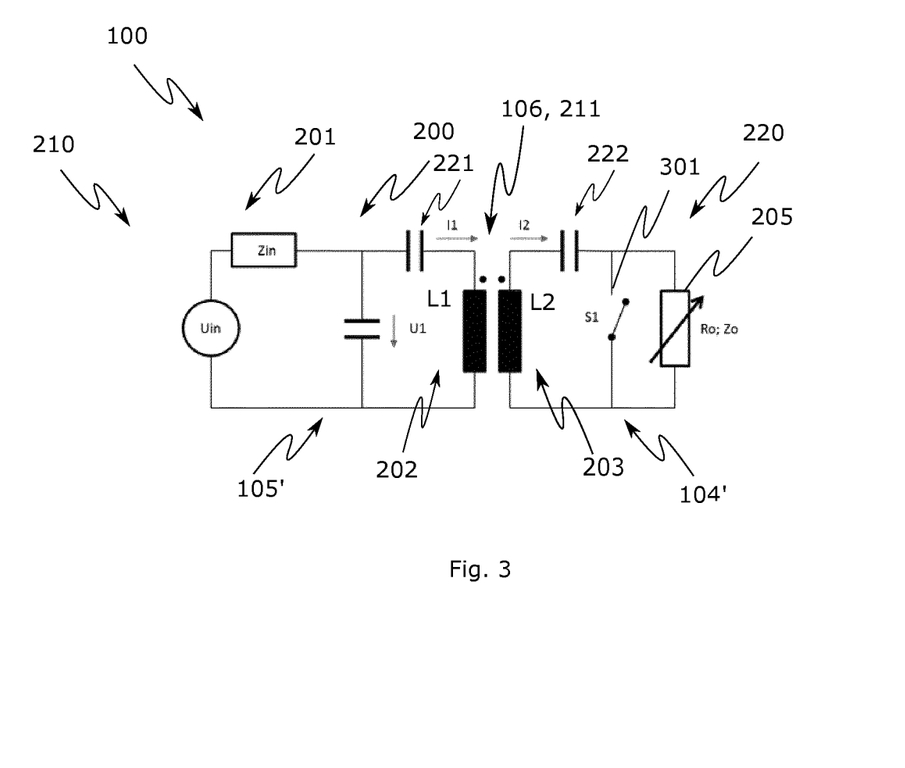
FIG. 3 shows a simplified illustration of the inductive charging system from FIG. 2 according to an example embodiment of the present invention.

FIG. 3 shows a simplified illustration of the inductive charging system 100 or the system 100 for energy transmission according to an example embodiment of the present invention. The regulation of an ICS system 100 can contribute to ensuring the functional safety in an ICS system. Because of the strong magnetic fields 106 that are used for power transmission, there may be regulations to protect the environment from excessive magnetic radiation. These regulations can provide, for example, that a field 106 which is generated by a GPM 105 without a CPM 104 being present or that, if a CPM 104 is unfavorably coupled to the GPM, field 106 is switched off after 2 seconds at the latest. It must therefore be ensured that it can be established within a time window of 2 seconds that the GPM 105 and the CPM 104 are correctly coupled via the field 106. Otherwise, field 106 must be deactivated.

A WLAN 101 that is used for communication between GPM 105 and CPM 104 can have a cycle time of up to 300 ms. The feedback via channel 101 can ensure that CPM and GPM are still coupled. If the vehicle rolls away and the CPM does not consume any power from the GPM, this is detected and the power supply to the GPM is cut off. Even if there is no signal via the return channel 101 for 2 s, the energy transmission may be aborted for safety's sake, because it cannot be ruled out that the signal will fail due to the loss of the coupling or a defect in a component of the return channel 101.

The start of inductive charging is carried out with a constant duty cycle and a variable frequency by the inverter 201 or PWM (pulse-width modulation) generator 201, the variable frequency being a frequency shift. The start frequency at which the PWM generator 201 begins is set at the maximum possible frequency in order to provide the greatest possible attenuation between the input variable, i.e., the duty cycle and the output variable from the primary component 202 to the GPM 105.

If a suitable operating point is found, a resonance forms between primary component 202 and secondary component 203 and energy can be transmitted between primary component 202 and secondary component 203 via field 106. Depending on the working point, this working frequency or resonant frequency is set between 81.35 kHz and 89.5 kHz.

If, after passing through one of these frequency bands with a constant duty cycle or pulse duty factor, a predefinable minimum power is not detected, then charging is not possible. Thus, if the GPM 105 is transmitting power, the power received by the CPM 104 is not above a minimum threshold value, the start-up process of the inductive charging is aborted. Consequently, if there is a low coupling between GPM 105 and CPM 104, loading is suspended or blocked. Such a low coupling can result with a large displacement between GPM 105 and CPM 104. A feedforward characteristic ensures that the time interval of the start-up process does not exceed a predefinable value of, for example, 2.0 s. This immediate interruption of the charging process during the start phase when the predeterminable minimum power is not reached can ensure safety when starting the ICS without communication between GPM 105 and CPM 104 being necessary.

The greater the distance between GPM 105 and CPM 104, the lower the frequency at which the power or energy can be transmitted. In other words, the greater the distance between GPM 105 and CPM 104, the lower the resonant frequency, or, that is to say, the resonant frequency depends on the distance between GPM 105 and CPM 104.

However, if the charging process is carried out and the coupling between GPM 105 and CPM 104 is continuously confirmed via control loop 210 with feedback channel 101, an overvoltage situation at output 220 can occur. This is because a magnetically coupled system, in particular, a magnetically loosely coupled system 100, has a system behavior that is similar to that of a power source. An inductive charging system 100 is such a loosely coupled system because of the mobility of the GPM in relation to the CPM. This means that the system 100 for energy transmission or the system 100 for inductive charging, like a power source, has a high internal impedance at the output 220. When the load 205 is shed, the system 100 therefore continues to attempt to drive the current into the output 220. In the event of a load dump or load shedding, i.e., if, for example, a fuse in the vehicle is triggered, a plug is unplugged, a cable is disconnected or the battery contactors are opened, the system, by means of the excited oscillating circuit and its continued excitation from the ground pad module 105, acts at output 220 like a current source with a large internal resistance to the DC intermediate circuit of the vehicle, which is connected to output 220 and is represented in FIG. 3 by load 205. Parts of the energy that is stored in the oscillating circuit is thereby discharged into the high-impedance output 220, which can generate a very high voltage at the output 220 via the low capacitance of the output 220. This voltage can be well above the working voltage and design voltage of the corresponding circuits in the car that are connected to output 220, for example, devices such as DC/DC converters or motor converters that are connected to the DC circuit at output 220 and represented by resistor 205 are going out. This further driving leads to a voltage increase at output 220 of transmission system 100. This excessive voltage increase due to the load shedding could destroy the components at the output of the transmission system 100, for example, rectifiers or filters, as a result of the overvoltage.

In order to prevent destruction during proper operation due to the output voltage at output 220 rising above a predeterminable limit value, the secondary circuit device according to the invention provides a protective device 301 which detects a load shedding at output 220 of energy transmission system 100 and very quickly reduces the active energy transmitted to output 220 and/or stops the energy transmission. The protective device 301 can use both hardware components and software components for the rapid response. However, in order to achieve a quick response, use of software components is avoided as much as possible.

In order to reduce the active energy transmitted to the output 220 and/or to stop the energy transmission, various active mechanisms can be used alone or in combination.

One possibility to stop the energy transmission is to use the feedback channel 101, after the load shedding at the output 220 of the energy transmission system 100 has been detected, to command the energy transmission to be switched off by means of a command via the channel 101, for example, the WLAN channel 101, to the input of the energy transmission system. However, because the channel 101 may use communication protocols that are on higher layers of the OSI protocol, this instruction to the primary circuit device 105' could run slowly.

Figure 4:
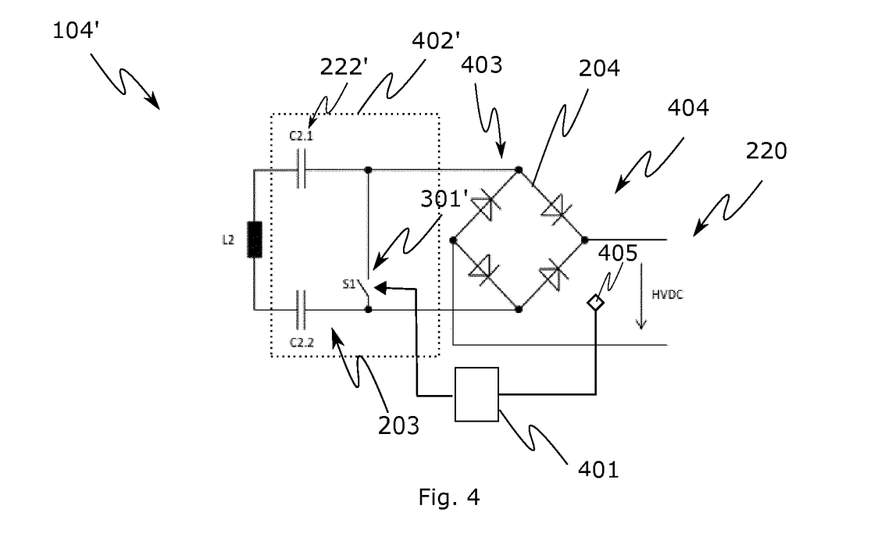
FIG. 4 shows a circuit diagram of a secondary circuit device with a clamper circuit unit for short-circuiting an energy conducting unit according to an example embodiment of the present invention.

FIG. 4 shows a circuit diagram of a secondary circuit device 104' with a clamper circuit unit 301' for short-circuiting an energy conducting unit 402' according to an example embodiment of the present invention. FIG. 4 shows the secondary circuit device 104', with the secondary coil L2 for transmitting and/or receiving magnetic energy of a magnetic field 106 and for converting the magnetic energy into electrical energy, also with a rectifier unit 204 for rectifying the electrical energy and a secondary-side detection unit 401. The primary circuit device 105' is not shown in FIG. 4.

The secondary coil L2 is connected to the rectifier unit 204 via an energy conducting unit 402'. The energy conducting unit 402' is designed to transmit electrical active energy and electrical reactive energy and is connected to an input 403 of the rectifying device 204. The energy conducting unit 402' is part of a secondary resonant circuit 203, which essentially has the coil L1 and the capacitor 222'. The secondary resonant capacitor 222' is formed from the two capacitors C2.1 and C2.2, which are each connected to a different terminal of the coil L2. The respective other end of the two capacitors C2.1 and C2.2 is connected to a different connection of the input 403 of the rectifier 204. Alternatively, only one resonant capacitor C2 could be used instead of it being divided into two elements C2.1 and C2.2. However, the division into two elements simplifies the insulation coordination. This applies to all drawings, descriptions and embodiments.

Arranged at the terminals of capacitors C2.1 and C2.2 that are remote from coil L1, is the clamping circuit 301' which connects the terminals of capacitors C2.1 and C2.2 that are remote from coil L1 to one another. Because the clamping circuit 301' is located in the energy conducting unit 402', it can influence the energy conducting unit 402' when it is activated. The clamping circuit 301' is arranged between the capacitors C2.1 and C2.2 and the input 403 of the rectifier unit 204.

By activation of the clamping circuit 301', the input 403 of the rectifier unit 204 can be short-circuited, as a result of which the impedance and/or quality Q of the secondary resonant circuit 203 and, in particular, the output impedance and/or the quality Q of the energy conducting unit 402' changes. The quality can be influenced by a plurality of elements. However, the quality is essentially influenced by the changing impedance caused by the switching of the clamping circuit 301'.

The rectifier unit 204 has an output 404 for providing the electrical active energy as voltage and/or current. This output 404 of the rectifier unit 204 corresponds in FIG. 4 to the output 220 of the system 100 for energy transmission. Filter elements, which are not shown in FIG. 4, can also be installed between the output 404 and the output 220. As long as a battery 205, for example, a traction battery 205, is connected at output 220, the output voltage at output 404 of rectifier unit 204 is defined by the voltage of battery 205 and by parasitic elements of the battery, such as line resistances and internal resistance. A variable output of the system 100 thus generates mainly an output current at the output 220 which changes in accordance with the change in output and which can be used to charge the battery 205, as long as the battery 205 is connected, because of the essentially constant output voltage 220 of the battery 205. The voltage provided at the output 220 can be the intermediate circuit voltage HVDC (high-voltage DC), which is a DC voltage after rectification by the rectifier unit 204 or the rectifier 204.

The secondary-side detection unit 401 is connected to the input 403 and/or the output 404 of the rectifier unit 204 in order to detect an overvoltage at the input 403 and/or the output 404 of the rectifier unit 204 (in FIG. 4 the case is shown that the secondary-side detection unit 401 is connected to the output 404 of the rectifier unit 204 by means of sensor 405). The output voltage from which an overvoltage is determined is determined with the voltage probe 405 or the voltage sensor 405. The secondary-side detection unit 401 is responsible for determining the overvoltage.

The secondary-side detection unit 401 is designed in such a way that, when the overvoltage and/or an overcurrent is detected at one of the outputs 404 or 220 of the rectifier unit and/or when an external harmful magnetic field is detected, it influences the energy conducting unit 402' by short-circuiting so that the transmission of the electrical active energy is limited. In particular, by short-circuiting the energy conducting unit 402' between the resonant capacitors C2.1 and C2.2 222' and the input 403 of the rectifier unit 204, the impedance and/or quality Q of the resonant circuit 203 is changed. By changing the impedance and/or quality Q, this short-circuiting also affects the magnetic field 106, which penetrates the secondary coil L2.

The protective device S1, 301' or crowbar 301', which is activated by the secondary-side detection unit 401, is used for the short-circuiting. By short-circuiting the input 403 of the rectifier unit 204, the transmission oscillating circuit 203 or the secondary resonant circuit 203 with the secondary coil L2 and the secondary resonant capacitor C2.1 and C2.2 222' is short-circuited, the secondary resonant capacitor 222' being designed as a parallel circuit of two capacitors. The short-circuiting connects the terminals of the capacitors C2.1 and C2.2 that are remote from the coil.

The detection of the load shedding at the output 220 of the energy transmission system and the short-circuiting of the transmission oscillating circuit 203 has the effect that only a fraction of the energy is transmitted because of the change in the impedance and/or quality Q. In addition, the energy present in the system at the instant of short-circuiting is reflected to the input of the primary circuit device 105'. The primary oscillating circuit 202 may continue to oscillate due to the fact that the active energy is no longer drawn from the magnetic field by the car pad module 104. Furthermore, the energy stored in the oscillating circuit 203 of the car pad module can be reflected into the ground pad resonant circuit 202 or primary resonant circuit 203. The effects of the oscillation and the reflection of the energy generated by the inverter 201 are effective as long as energy is output by the inverter 201 to the oscillating circuits. This reflection is detected in the primary circuit device 105', and the energy transmission is interrupted by switching off the primary-side power source 201 of the transmission system 100. After the inverter 201 and thus the source of danger have been switched off, the loosely coupled oscillating circuits of the car pad module 104 and ground pad module 105 oscillate and any energy that may still be present is dissipated. By changing the impedance and/or quality by short-circuiting the clamper circuit unit 301', it is achieved that both the energy transmission on the secondary side is attenuated in the energy conducting unit and, in addition, the primary circuit device 105' is informed of the fault situation on the secondary side, and the primary circuit device 105' stops the energy supply.

In other words, an additional communication channel is opened for communication between secondary circuit device 104' and primary circuit device 105' in the form of the reflection of the energy on the physical level and can be used in parallel to feedback channel 101 to communicate with the primary circuit device 105' and to exchange information. Because this communication or this information exchange takes place directly on the physical level, this additional channel is faster than the radio link 101, so that it is possible to react quickly to the fault situation of the load shedding.

Figure 5:
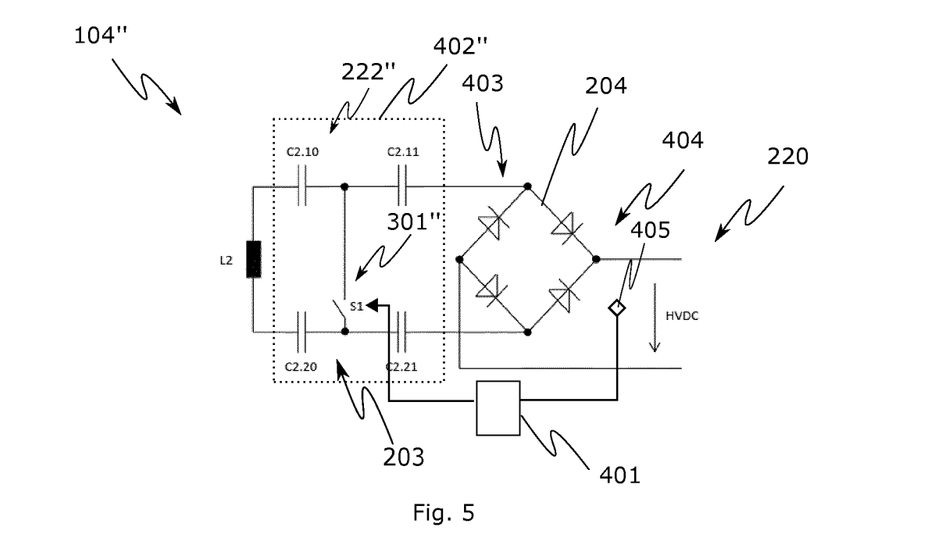
FIG. 5 shows a circuit diagram of a secondary circuit device with a clamper circuit unit for detuning an energy conducting unit according to an example embodiment of the present invention.

FIG. 5 shows a circuit diagram of a secondary circuit device 104" having a clamper circuit unit 301" for detuning an energy conducting unit 402" according to an example embodiment of the present invention. The detuning of the energy conducting unit 402", in particular, the detuning of the secondary resonant circuit 203, causes a change in the resonant frequency of the secondary resonant circuit 203.

This embodiment of the protective device 301" or clamper circuit unit 301" can be designed in such a way that, in the event of an accidental introduction of energy via the car pad module 104, the oscillating circuit is prevented from oscillating above a predeterminable safety threshold by a reduction in quality or detuning and/or a change in impedance. Energy could be accidentally applied if the CPM 104 is located over a defective GPM 105 that generates a charge field even though it was not prompted to do so. Unintentional charging of the vehicle battery can also be prevented in this way. It would be conceivable that magnetic fields from the outside penetrate into the vehicle underbody and thus into the car pad module unintentionally or by malicious intent or due to defects in a shield. To prevent this, it is conceivable to keep the protective device 301" or clamper circuit unit 301" permanently active as long as the vehicle is not to be charged.

The structure of the secondary circuit device 104" essentially corresponds to the structure of the secondary circuit device 104' from FIG. 4. In this embodiment, the secondary-side detection unit 401 is designed in such a way that, when the overvoltage and/or the short circuit is detected at the input 403 and/or at the output 404 of the rectifier unit 204, the energy conducting unit 402 is influenced in such a way that the transmission of the electrical active energy via the energy conducting unit 402" is limited. For this purpose, the clamper circuit unit 301" or crowbar 301" is designed in such a way that the transmission path 402" between the secondary coil L2 and the rectifier unit 204 is detuned in order to limit and/or attenuate the transmitted energy.

Compared to the embodiment from FIG. 4, in which the impedance and/or quality Q of the energy conducting unit 402' is changed, when the clamper circuit unit 301" is arranged between the capacitors C1.10 and C1.11 or C2.20 and C2.21 according to FIG. 5, resonant frequency of the secondary resonant circuit 203 or the energy conducting unit 402" is strongly shifted by the circuit to a lower frequency than the resonant frequency of the primary resonant circuit 202. As a result of this shift to frequencies far below the resonant frequency, in particular, due to the associated detuning of the energy conducting unit 402", the clamper circuit unit 301" reduces the risk of oscillation and an oscillation is simply no longer possible. Thus, the arrangement shown in FIG. 5 makes the car pad module 104" more resistant to external magnetic fields, in particular, to inadvertently applied magnetic fields. The circuit according to FIG. 5, in particular, the clamper circuit unit 301" and the capacitors C2.10, C2.11, C2.20, C2.21, can be designed in such a way that a destruction is only possible when the strength of a magnetic field that feeds through above L2 is exceeded, the limit value being set so high that it is not exceeded or is essentially always undershot during normal operation.

The transmission path between secondary coil L2 and rectifier unit 204 is essentially determined by the energy conducting unit 402". The clamper circuit unit 301" is arranged between the series connection of the secondary resonant capacitors C2.10, C2.11 and C2.20, C2.21 222". The series connection of the secondary resonant capacitors C2.10, C2.11 connects a first connection of the secondary coil L2 to a first connection of the input 403 of the rectifier unit 204. The series connection of the secondary resonant capacitors C2.20, C2.21 connects a second connection of the secondary coil L2 to a second connection of the input 403 of the rectifier unit 204. The terminals of the first capacitors C2.10 and C2.20 that are remote from the coil are connected to the terminals of the second capacitors C2.11 and C2.21 that are near the coil. The clamper circuit unit 301" is also connected at these terminals. The clamper circuit unit 301" is separated from the secondary coil L2 by means of the first capacitors C2.10 and C2.20 and separated from the input terminals of the rectifier unit 204 by means of the second capacitors C2.11 and C2.21. Alternatively, the capacitors C2.20 and C2.21 can also be omitted. However, the capacitances C2.20 and C2.21 can be useful for good insulation coordination.

The detection of the load shedding at the output 220 of the energy transmission system 100 leads to a detuning of the transmission path 402" by activation of the clamper circuit unit 301", in particular, a shift of the resonant frequency of the energy conducting unit to lower and/or higher frequencies that are different from the resonant frequency of the primary resonant circuit 202, so that only a fraction of the energy can then be transmitted. The remaining energy transmitted by the primary circuit device and/or energy transmitted by another external magnetic field can be dissipated or attenuated by suitable measures in such a way that an overvoltage at output 220 of the energy transmission system is prevented. This dissipation is accomplished, in particular, by the detuning reducing the gain for the working frequency and thereby greatly reducing the oscillation of the oscillating circuit. In order to achieve an equally high L2 voltage, after the frequency shift of the secondary resonant circuit 203 with the resonant frequency of the primary resonant circuit 202 unchanged, the magnetic field 106 generated on the primary side would have to be increased many times over. However, the increase is only possible up to a point which can be viewed as unattainable in practical operation. By means of a feedback via the feedback channel 101, the primary circuit device 105' can then be switched off in order not to transmit any further energy to the secondary circuit device.

The detuning of the CPM 104 according to FIG. 5 has the effect that with the magnetic field of 85 kHz which is generated by the primary resonant circuit 202, an unlimited voltage increase essentially cannot be achieved. Or, in other words, the essentially exponential voltage gain at the resonant frequency of the secondary resonant circuit 203, which could lead to the output voltage rising essentially unrestrictedly and uncontrollably because of the voltage increase, can be pushed by detuning out of the dangerous range of the operating frequency of the energy transmission system 100 or of an external interfering magnetic field into a frequency range in which there is no magnetic field that could rise to an excessive voltage.

The reduction of the quality Q and/or the impedance of the energy conducting unit 402 according to FIG. 4 also causes a shift in the resonant frequency of the secondary resonant circuit 203 compared to the resonant frequency of the primary resonant circuit 202, but for wider frequency ranges than in the case of detuning. Therefore, the effect of shifting the resonant frequency is not so great, and the shift must continue to be made to achieve the same effect.

Figure 6:
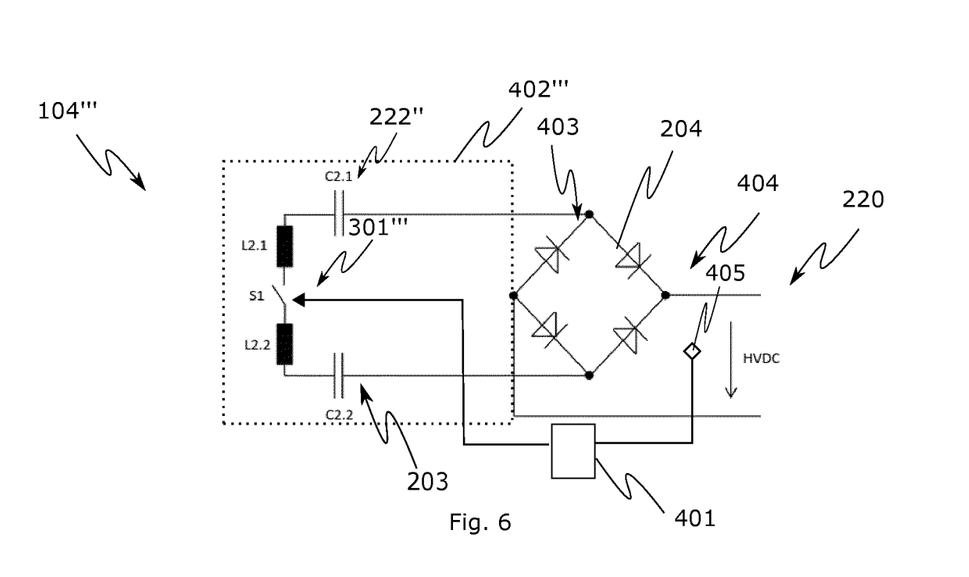
FIG. 6 shows a circuit diagram of a secondary circuit device with a clamper circuit unit for disconnecting an oscillating circuit of an energy conducting unit according to an example embodiment of the present invention.

FIG. 6 shows a circuit diagram of a secondary circuit device 104" with a clamper circuit unit 301" for disconnecting an oscillating circuit 203 of an energy conducting unit 402" according to an example embodiment of the present invention. The structure of the secondary circuit device 104" essentially corresponds to the structure of the secondary circuit device 104' from FIG. 4 and the secondary circuit device 104" from FIG. 5. The resonant capacitor 222" has the two capacitors C2.1 and C2.2 and, together with the two coils L2.1 and L2.2, forms the resonant circuit 203 of the energy conducting unit 402". The clamper circuit unit 301", which is designed to open the oscillating circuit 203, is arranged between the two coils L2.1 and L2.2. This opening is possible anywhere in the oscillating circuit, that is, for example, between L2.1 and C2.1 or between C2.1 and the rectifier 403. The clamper circuit unit 301" is controlled by the secondary detection device 401, which monitors the output 220 of the system 100 for energy transmission or the output of the rectifier unit 204 and triggers the clamper circuit unit 301" in the event of a voltage increase. When the load shedding is detected at the output 220 of the energy transmission system 100, the oscillating circuit 203 is disconnected and the energy transmission via the energy conducting unit 402''' is thus prevented. As an alternative to the secondary oscillating circuit 203, any other oscillating circuit can be separated. The primary oscillating circuit 202 could thus also be disconnected when communication takes place between the secondary circuit device 104" and the primary circuit device 105'. If the oscillating circuit is opened, excessive voltage can no longer build up in the oscillating circuit 203. The voltages induced by the primary-side magnetic fields in an open oscillating circuit are within a reasonable order of magnitude and can be handled by suitable insulation coordination.

Figure 7:
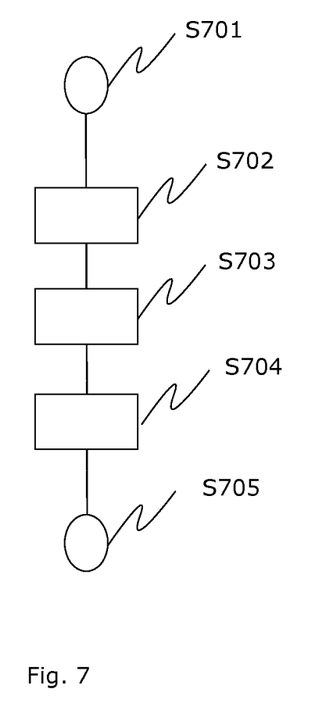
FIG. 7 shows a flow diagram for a method for testing a secondary circuit device according to an example embodiment of the present invention.

FIG. 7 shows a flow diagram for a method for testing a secondary circuit device according to an example embodiment of the present invention. The method is based on an idle state S701. The method is triggered in step S702 when a GPM 105 is coupled to a CPM 104, as a result of which the secondary circuit device 104' is coupled to a primary circuit device 105'. In phase S702, a test signal is then injected into the energy conducting unit 402' for the transmission of the test signal to the primary circuit device 105' even before the energy transmission is started. The test signal can be a positioning signal with a frequency of 125 kHz. In the state S703, the test signal is then detected in the primary circuit device 105' in order to obtain a comparison value.

In state S704, the energy conducting unit 402' and/or the magnetic field 106 are influenced with the secondary-side detection unit 401 in order to simulate a load shedding fault, i.e., without the voltage sensor 405 and/or the secondary-side detection unit 401 having detected an overvoltage. After the influencing, a change in the test signal is detected in the primary circuit device, the test signal still being injected essentially unchanged into the energy conducting unit 402'. If a change in the detected test signal is recognized, the functionality of the circuit is assumed and a charging process is started. If no change is detected, a defect is displayed and the charging process is aborted.

In state S705, the method is terminated by a return to the idle state.

The secondary circuit device 104' can thus be checked with the aid of an injected test signal before the energy transmission. In one example, a positioning signal that is coupled into the input or output of the energy transmission system 100 can be used as a test signal. In particular, the test signal can be coupled in at the input 403 or at the output 404 of the rectifier unit 204 and propagate in the direction of the input of the primary circuit device 105' at the main terminal 107. The direction of propagation of the test signal thus corresponds to a direction opposite that of the energy transmission and, for example, a receiving device for the positioning signal or another primary-side detection unit which is present in the primary circuit device 105' can be used as a detector.

Alternatively, a test signal can also be coupled in at the input of the primary circuit device 105' at the main terminal 107 and a detection can be carried out at the output 220 of the energy transmission system 100 or the output 404 and/or the input 403 of the rectifier unit 402. In this alternative case, the direction of propagation of the energy transmission corresponds to the direction of propagation of the test signal and the secondary-side detection unit 401 can be used to detect the test signal. In this case, the energy transmission 106 itself can be used directly as a test signal and, for example, if the charging power is greatly reduced, which can be set via the inverter 201, the test can be carried out immediately after the charging has started. When the clamping device 301 is triggered, the charging process is interrupted briefly if the protective functionality is working properly, after which permanent charging is made possible again with tested circuit elements and the normal charging power.

The test signal is received and detected on the side of the respective receiver, i.e., the primary-side detection unit or the secondary-side detection unit 401. After the test signal has been detected, the clamper circuit unit 301' or crowbar 301' is triggered either by a hardware or software event in order to simulate an error. If the protective device is functioning correctly, the test signal, in particular, the positioning signal, is attenuated and the primary-side detection unit or the secondary-side detection unit 401 can essentially no longer detect a signal. Via this detection path along the direction of propagation of the test signal, for example, the response voltage of the detector 401 for load shedding or of the detector 401 for overvoltage at the output of the system can be checked regularly in the installed system and a readjustment and/or recalibration of the respective primary-side and/or secondary-side load shedding detector 401 can be performed. The respective load shedding detector, in particular, the secondary-side detection unit 401, can use a limit value and/or threshold value for the output voltage at output 220 in order to test the correct functioning.

Because the protective structure prevents the destruction of an internal or external component, a regular functional test of the clamper circuit unit 301 is also possible, for example, before the start of each energy transmission and/or during the energy transmission.

In addition, it should be pointed out that "comprising", "including", and "having" do not exclude any other elements or steps and that "a" or "an" does not exclude a plurality. It should also be noted that features or steps that have been described with reference to one of the above embodiments can also be used in combination with other features or steps of other embodiments described above. Reference signs in the claims are not to be regarded as a limitation.

The invention claimed is:

1. A system for energy transmission, the system comprising:
    a car pad module device comprising a secondary circuit device, the secondary circuit device comprising:
        a secondary coil configured to transmit and/or receive magnetic energy of a magnetic field and configured to convert the magnetic energy into electrical energy;
        a rectifier unit configured to rectify the electrical energy, the rectifier unit comprising an input and an output, the output configured to provide electrical active energy as voltage and/or current;
        an energy conducting unit connected to the input of the rectifier unit and connecting the secondary coil to the rectifier unit, the energy conducting unit configured to transmit the electrical active energy and electrical reactive energy; and
        a secondary-side detection unit connected to the input and/or the output of the rectifier unit in order to detect an overvoltage at the input and/or the output of the rectifier unit and/or an external magnetic field, wherein when the overvoltage is detected at the input and/or the output the secondary-side detection unit is configured to interrupt the energy conducting unit thus limiting transmission of the electrical active energy and causing the electrical reactive energy to be reflected by the secondary coil to influence the magnetic field; and
    a ground pad module device comprising a primary circuit device, the primary circuit device comprising:
        a primary coil configured to convert electrical energy into magnetic energy, the primary coil further configured to transmit and/or receive the magnetic energy; and
        an energy generating device connected to the primary coil, the energy generating device configured to provide the electrical energy as electrical active energy and/or electrical reactive energy, the energy generating device configured to extract a command from received magnetic energy as a result of the electrical reactive energy being reflected via the magnetic field from the secondary coil, the energy generating device further configured to derive a control command from the command as extracted in order to change a variable of the energy provision that limits the electrical energy provided to the primary coil for transmission to the secondary coil via the magnetic field;
    wherein the car pad module device and the ground pad module device are capable of being coupled via the magnetic field.

2. The system according to claim 1, wherein the secondary-side detection unit is configured such that it changes a quality, an impedance, and/or a resonant frequency of the energy conducting unit when the overvoltage is detected at the output.

3. The system according to claim 2, wherein a change in the resonant frequency of the energy conducting unit is carried out by connecting and/or disconnecting a capacitor and/or a capacitance part in the energy conducting unit.

4. The system according to claim 2, wherein the impedance of the energy conducting unit is changed by short-circuiting the rectifier unit.

5. The system according to claim 1, wherein the secondary-side detection unit is configured to provide a command when it detects the overvoltage in such a way that it is capable of being transmitted via the magnetic field in order to control an energy transmission device to change the magnetic energy of the magnetic field.

6. The system according to claim 1, wherein, when the overvoltage is detected, the secondary-side detection unit is designed to adapt the energy conducting unit so that the electrical reactive energy is at least partially reflected and transmitted via the magnetic field.

7. A method of testing the secondary circuit device of the system according to claim 1, the method comprising:
    coupling the secondary circuit device to a primary circuit device;
    injecting a test signal into the energy conducting unit for transmission to the primary circuit device;
    detecting the test signal in the primary circuit device;
    influencing the energy conducting unit and/or the magnetic field with the secondary-side detection unit; and
    detecting a change in the test signal in the primary circuit device.

8. The method of testing the secondary circuit device of the system according to claim 1, the method comprising:
    coupling the secondary circuit device to a primary circuit device;
    injecting a test signal into a primary resonant circuit for transmission to the secondary circuit device;
    detecting the test signal in the secondary circuit device;
    influencing the energy conducting unit and/or the magnetic field with the secondary-side detection unit; and
    detecting a change in the test signal in the secondary circuit device.

9. The system according to claim 2, wherein the secondary-side detection unit is configured such that it changes the quality of the energy conducting unit when the overvoltage is detected at the output.

10. The system according to claim 2, wherein the secondary-side detection unit is configured such that it changes the resonant frequency of the energy conducting unit when the overvoltage is detected at the output.

* * * * *